United States Patent

[11] 3,553,352

[72] Inventors Charles Bailey Neal;
William Daniel Schuster; Benton Boyd
Scott, Batavia, N.Y.

[21] Appl. No. 657,623
[22] Filed Aug. 1, 1967
[45] Patented Jan. 5, 1971
[73] Assignee Sylvania Electric Products, Inc.
a corporation of Delaware

[54] PHOTOGRAPHIC FILM AND TELEVISION SIGNAL REPRODUCTION APPARATUS
11 Claims, 2 Drawing Figs.

[52] U.S. Cl. .......... 178/5.2, 178/6
[51] Int. Cl. .......... H04n 9/02, H04n 7/00
[50] Field of Search .......... 178/5, 6, 5.6, 5.8, 5.2, 5.4, 6.6A, 5.2A

[56] References Cited
UNITED STATES PATENTS

| | | | |
|---|---|---|---|
| 2,318,118 | 5/1943 | Warner et al. | 178/5.6 |
| 2,874,213 | 2/1959 | Beers | 176/6 |
| 3,099,709 | 7/1963 | Barry | 178/6.6(A) |
| 3,128,333 | 4/1964 | Loughlin | 178/5.2(A) |
| 3,270,131 | 8/1966 | Dinter | 178/6.6(A) |
| 3,404,224 | 10/1968 | Revelo et al. | 178/6 |

OTHER REFERENCES

Shadbolt, " Amateur Color Television," QST, Vol. 44, No. 9, ARRL, West Hartford, Conn., Sept. 1960

*Primary Examiner*—Richard Murray
*Attorneys*—Norman J. O'Malley, Robert E. Strausser and Thomas H. Buffton

ABSTRACT: A reproduction system combines an electrical-to-optical signal transducer and an optical-to-electrical signal transducer to provide an image reproduction of both transmitted programs and photographic films. Therein, a switching means is utilized for selectively applying electrical signals derived from transmitted signals and from photographic films to an image reproducer to provide an image display.

INVENTORS
CHARLES B. NEAL
WILLIAM D. SCHUSTER
BENTON B. SCOTT
BY
Robert E. Strauser
ATTORNEY INVENTORS
CHARLES B. NEAL
WILLIAM D. SCHUSTER
BY BENTON B. SCOTT
Robert E. Strausser
ATTORNEY

PHOTOGRAPHIC FILM AND TELEVISION SIGNAL REPRODUCTION APPARATUS

BACKGROUND OF THE INVENTION

A need has long existed for a consumer product capable of providing a visual display in response to both televised programs and photographic films. Although such visual displays are obtainable utilizing systems employing combinations of relatively complex and expensive so-called "commercial" apparatus, there is no such visual display system, as far as is known, available to the general public utilizing apparatus within the classification of a home entertainment instrument. In other words, all of the known apparatus for providing both televised programs and photographic film displays falls within the general classification of and is primarily designed for the "commercial" rather than the "consumer" market.

More specifically, "commercial" systems and apparatus are perhaps best exemplified by the well-known television camera, television receiver, and a film presentation means. In such systems the apparatus, in the form of separate identities is utilized in combinations to provide a viewer with a visual display of either photographic films or televised programs. For example, the television camera serves as an optical-to-electrical signal transducer while the television receiver serves as an electrical-to-optical signal transducer.

However, it is obvious that such a relatively complex and expensive television system would not fall into the category of a "consumer" product. Also, it is even more obvious that the average consumer is not likely to invest in a television camera and a photographic film presentation means in order to provide a visual display of film on a television receiver. Moreover, it is doubtful that the ordinary consumer would possess the skill or desire necessary to employ such apparatus to provide a visual film display.

Other known types of reproduction systems include various forms of image scanners such as the well-known "flying spot" type of cathode ray tube system and a monitor in the form of an image reproducer such as a picture tube. Therein, a photographic film is visually displayed on the monitor in response to signals from the image scanner.

Again, the known reproduction systems are of the "commercial" rather than "cosumer" type and are relatively expensive and complex. Moreover, none of the known systems include the capability for visually displaying both commercial television programs and personal photographic films utilizing components common to both types of visual display.

OBJECTS AND SUMMARY OF THE INVENTION

Therefore, it is an object of this invention to provide an enhanced image reproduction system. Another object of the invention is to provide an improved system for visually displaying both television programs and photographic films. Still another object of the invention is to provide a compatible monochrome and color reproduction system for visually displaying televised programs and personal films. A further object of the invention is to provide a simplified and relatively inexpensive reproduction system integrated to provide a visual display of both televised program and photographic film. A still further object of the invention is to provide a visual display reproduction system utilizing components common to both electrical-to-optical and optical-to-electrical signal transducers for effecting the visual display.

These and other objects and advantages are achieved in one aspect of the invention by a reproduction system wherein electrical signals derived from a television signal by an electrical-to-optical signal transducer having an image reproducer and electrical signals developed by an optical-to-electrical signal transducer are selectively applied by a switching means to the image reproducer to provide an image display.

DESCRIPTION OF THE PREFERRED EMBODIMENT

Figure 1:
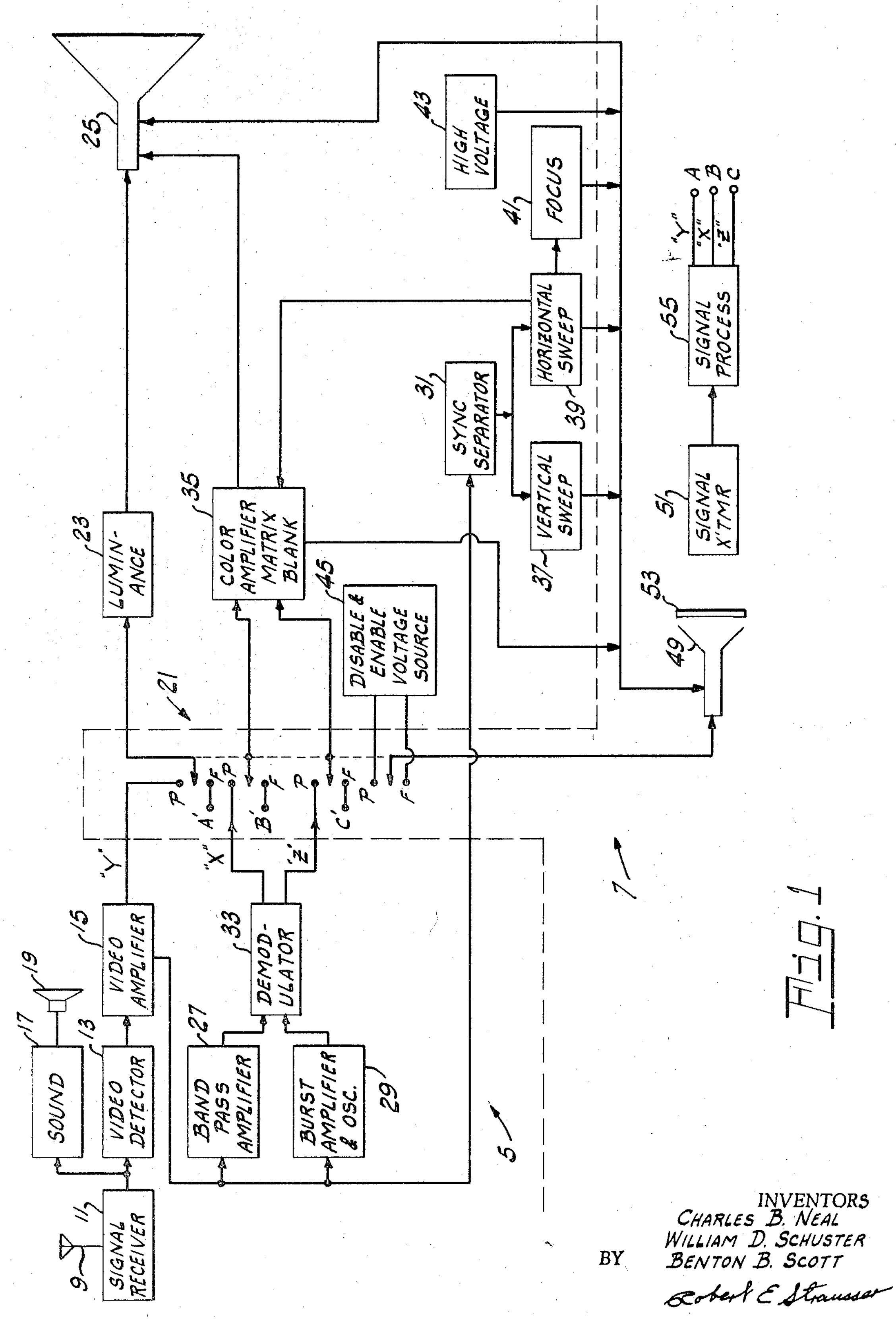
FIG. 1 is a diagram, in block form, illustrating a preferred embodiment of an image reproduction system.

For a better understanding of the present invention, together with other and further objects, advantages, and capabilities thereof, reference is made to the accompanying drawings and appended claims in conjunction with the following disclosure.

Referring to the drawings, a preferred form of reproduction system includes an electrical-to-optical color signal transducer in the form of a color television receiver 5 and an optical to electrical color signal transducer in the form of a "flying spot" scanning system 7. Obviously, other forms of optical-to-electrical signal transducers, such as videotape recorders for instance, are also applicable and appropriate. As will be further explained, the transducing systems utilize a plurality of components in common to economically provide a capability for reproducing a color image in accordance with both transmitted color signals and color films.

The color television receiver 5 is typical of present-day color television receivers and includes a series coupled antenna 9 for intercepting transmitted color television signals, a signal receiver 11 having the usual radio frequency (RF) and intermediate (IF) amplification and detection stages, a video detection stage 13, and video amplification stages 15. A sound channel 17 having a loudspeaker 19 connected thereto is coupled to the output of the video detection stage 13. Composite video signals, representative of the brightness of a viewed image and usually referred to as luminance or Y signals, available from the video amplification stages 15 are coupled by way of a switching means 21, the purpose of which will be explained hereinafter, and a luminance channel 23 to the color image reproducer of picture tube 25.

Also, the above-mentioned composite video signals available from the video amplification stages 15 are coupled to the band-pass amplifier stage 27, a color burst amplifier and reference oscillation network 29, and a synchronizing pulse separation network 31. The band-pass amplifier stage 27 separates signals representative of chrominance information from the composite video signals and applies these separated chrominance signals to a demodulation network 33. The color burst amplifier and reference oscillation network 29 in response to color burst signals gated from the composite video signal develops reference oscillation signals which are also applied to the demodulation network 33.

The demodulation network 33 utilizes the well-known synchronous demodulation process to provide color control signals, normally referred to as X and Z signals, which are applied by way of the switching means 21 to a color amplification, matrix, and blanking network 35. Therein, color difference signals, usually represented as R-Y, B-Y and G-Y signals, are developed and these color difference signals are applied to the color picture tube 25 wherein the color difference signals are combined with the luminance or Y signals available from the luminance channel 23 to provide signals representative of the colors red, green and blue.

Further, the composite video signals available from the video amplification stages 15 are coupled to the synchronizing pulse separation network 31 wherein the synchronizing pulse signals are separated from the composite video signal and applied to and control the operation of both the vertical and horizontal sweep circuitry 37 and 39 respectively. The vertical and horizontal sweep circuitry 37 and 39 develop potentials sufficient to cause both vertical and horizontal scanning of the color picture tube 25, focusing of the color picture tube 25, and blanking of the color picture tube 25 during periods of scan retrace. These vertical and horizontal scanning potentials are applied to the color picture tube 25, or at least apparatus immediately associated therewith. Also, potentials developed in the horizontal sweep circuitry 39 are applied via a focus control network 41 and the color amplification, matrix, and blanking network 35 to the color picture tube 25 to effect the desired focusing and blanking thereof.

The color television receiver 5 also includes a high voltage potential source 43 wherein the well-known high voltage potentials are developed and applied to the color picture tube 25. Further, the color television receiver includes an enabling and disabling potential source 45 which is coupled to the switching means 21 for purposes to be explained hereinafter.

Additionally, the preferred color image reproduction system includes an optical to electrical color signal transducer in the form of a "flying spot" scanning system 7. The scanning system 7 includes an optical system 47 which in this embodiment is in the form of a "flying spot" cathode ray tube 49 and a signal transmitter 51 disposed upon opposite sides of a film holder 53. Also, the signal transmitter 51 is coupled to a signal processing network 55 which, in turn, is provided with output terminals A, B and C respectively.

Referring to the "flying spot" cathode ray tube 49 of the optical system 47, the cathode ray tube 49 is coupled to and energized by potentials and signals from the horizontal and vertical sweep circuitry 37 and 39, the focus control network 41, the high voltage potential source 43, and the blanking portion of the color amplification, matrix, and blanking network 35 of the color television receiver 5. Also, the cathode ray tube 49 is coupled by way of the switching means 21 to a source 45 of enabling and disabling potentials in the color television receiver 5.

In response to enabling potentials from the enabling and disabling potential source 45, the cathode ray tube provides a light source which horizontally and vertically traverses the viewing screen thereof and a film disposed in the film holder 53. This traversing light source, which is synchronized with the scanning of the color picture tube 25, provides a light beam which passes through the film disposed in the holder 53 and is modulated in accordance with the densities of the dyes of the film. The modulated light beam emerging from the opposite surface of the film activates the signal transmitter 51 which splits the light beam into red, green and blue component parts and converts each of these component parts into individual electrical signals representative of each of the red, green and blue component parts. In turn, these individual electrical signals are applied to the electrical signal processing network 55.

The signal processing network 55 includes all of the circuitry necessary for amplifying, DC restoring, and gamma correcting each of the red, green and blue electrical signals. Also, the signal processing network 55 includes a matrix network wherein the red, green and blue electrical signals are converted, in a well-known manner, to luminance and color control signals, usually represented as Y, X, and Z signals which appear at the output terminals A, B and C respectively. These terminals A, B and C respectively are connected to individual terminals A', B' and C' of the switching means 21 for purposes to be explained hereinafter.

Figure 2:
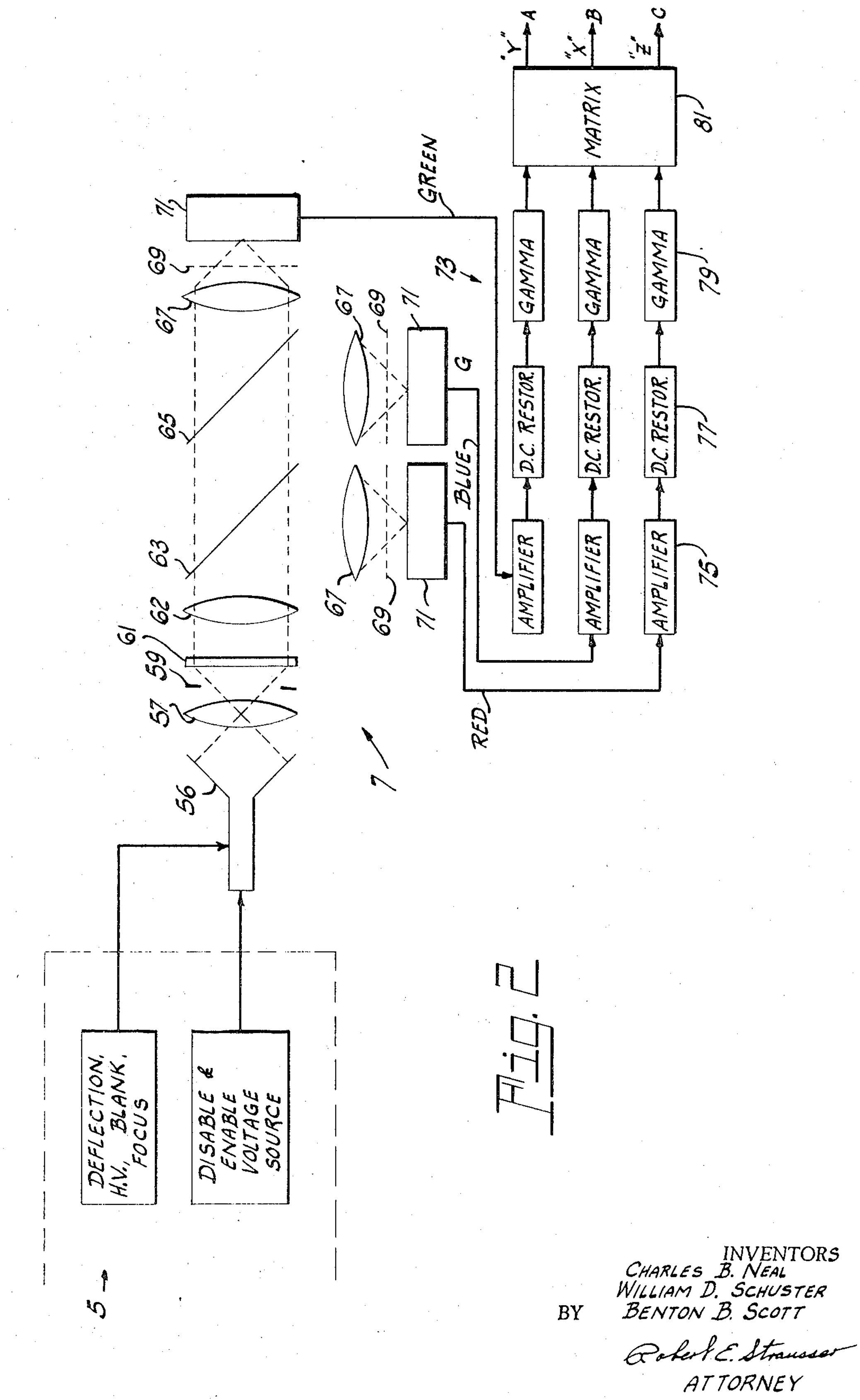
FIG. 2 is a diagrammatic illustration of a preferred form of optical-to-electrical signal transducer of the reproduction system of FIG. 1.

As an illustration of a preferred embodiment of the optical-to-electrical signal transducer 7 of FIG. 1, reference is made to FIG. 1 of the drawings. INN FIG. 2, the "flying spot" scanner type of optical-to-electrical color signal transducer 7 includes a cathode ray tube 56, a converging-type lens 57, and an aperture mask 59 disposed on one side of and in light-coupling relationship to a film holder 61. On the opposite side of the film holder 61 is a condenser-type lens 62, a pair of dichroic mirrors 63 and 65 and three individual signal conversion groupings each including a condensing lens 67, a color filter 69, and a photomultiplier type tube 71.

Each of the individual photomultiplier-type tubes 71 provides an electrical signal and all of the individual electrical signals are coupled to a signal processing network 73. The signal processing network 73 includes individual amplifiers 75, individual DC restoration circuitry 77, individual gamma correction circuitry 79, a matrix network 81, and individual output terminals A, B and C respectively.

In operation, all of the normal enabling potentials, horizontal and vertical deflection potentials necessary for scanning, high voltage potentials, focusing potentials, and retrace blanking potentials necessary to the operation of the cathode ray tube 56 are applied thereto from the color television receiver 5. Thus, synchronization of the cathode ray tube 56 and the color television receiver is achieved and there is provided a horizontal and vertical traversing light source having a wide frequency spectrum and of relatively low intensity. This light source is focused by the converting lens 57 through the aperture mask 59 onto a film disposed in the film holder 61. Preferably, selection of the film within the film holder 61 is remotely controllable by any one of a number of well-known remote control film selection means.

The light passing through the film disposed in the film holder 61 is modulated in accordance with the density of the dyes of the film and emerges therefrom to pass through the condenser-type lens 62 and strike the dichroic mirrors 63 and 65 respectively. The dichroic mirrors 63 and 65 split the light into red, green and blue components, in a manner well-known in the art, and each of the red, green and blue components is applied individually to one of the signal conversion groupings which includes a condensing lens 67, a color filter 69, and a photomultiplier tube 71.

Each of the photomultiplier tubes 71 provides an electrical signal in the form of a color video signal representative of the red, green and blue portion of the film at each specific section of light scanning of the film. Also, each of these representative color video signals contains a reference "black" level which is provided by the blanking signal applied to the cathode ray tube 56 from the color television receiver 5 during the period of scan retrace.

Thereafter, each of the individual color video signals available from the photomultiplier tubes 71 is applied to an individual one of the series coupled amplifiers 75, DC restoration circuitry 77, and gamma correction circuitry 79. The resultant individually processed color video signals are applied to the matrix network 81 where, in a well-known manner, the individually processed color video signals are combined in proportions to provide luminance and color control signals, Y, X and Z signals, which appear individually at the output terminals A, B and C respectively.

Referring now to the reproduction system illustrated in FIG. 1, the switching means 21 includes a plurality of decks each having a first and second operational location designated as P and F respectively. Also, the switching means 21 is preferably of the "ganged" type wherein all of the decks are simultaneously shifted upon positional alteration of the switching means 21. Obviously, relays and numerous other well-known multiple switching means are equally applicable to the apparatus. Again, the switching means is preferably of a remote control type.

When a consumer wishes to utilize the color reproduction system to view a displayed image, the color television receiver 5 is switched to the "on" position and a channel selected wherefrom a television signal is being transmitted. Thereupon, all of the synchronizing signals, horizontal and vertical sweep potentials, high voltage potentials, focus potentials, and blanking potentials available in the color television receiver 5 are applied to both the color picture tube 25 and the cathode ray tube 49 of the optical-to-electrical color signal transducer 7.

Now, assuming the consumer wishes to view a color television program, the switching means 21 is positioned such that the alterable arm thereof is in the first operational location P. Thereupon, the luminance signals Y available at the output of the video amplification stages 15 are applied via the switching means 21 and luminance channel 23 to the color picture tube 25. Also, the color control signals, X and Z signals, available at the output of the demodulation network 33 are applied via the switching means 21 and color amplifier, matrix, and blanking network 35 to the color picture tube 25. Further, the disabling potentials available from the enabling and disabling potential source 45 of the color television receiver 5 are applied to the cathode ray tube 49 of the optical- to-electrical signal transducer 7 rendering the transducer 7 inoperative for all practical purposes. Obviously, rendering the signal transducer 7 inoperative is not a necessity but does tend to extend the useful life of the components therein.

Should the consumer wish to view a film, the switching means 21 is positioned such that the alterable arm thereof is in the second operational location F. Thereupon, the enabling potentials available from the enabling and disabling potential source 45 are applied to the cathode ray tube 49 of the optical-to-electrical signal transducer 7. Also, the previously mentioned synchronizing signals, horizontal and vertical sweep potentials, high voltage potentials, focus potentials, and blanking potentials developed in the color signal receiver 5 are already available at the cathode ray tube 49 of the optical-to-electrical signal transducer 7.

Further, the luminance signals Y and color control signals X and Z available at the terminals A, B and C respectively of the optical-to-electrical signal transducer 7, which are connected to the terminals A′, B′ and C′ of the switching means 21, are applied via the luminance channel 23 and color amplification, matrix, and blanking network 35 to the color picture tube 25 of the color television receiver. Thus, the reproduction system provides a visual display of a film.

It should perhaps be noted that the reproduction system makes common usage of a plurality of components and circuitry. For instance, both the electrical-to-optical and the optical-to-electrical signal transducers, 5 and 7 respectively, of this particular embodiment make common usage of the luminance channel 23, the color picture tube 25, the color amplification, matrix, and blanking network 35, the synchronizing pulse separating network 31, the vertical sweep circuitry 37, the horizontal sweep circuitry 39, the focus control network 41, the high voltage potential source 43, the enabling and disabling potential source 45 and numerous other power supply potentials. Obviously, such common usage of circuitry and components provides greatly reduced complexity and cost.

Also, it should be noted that the synchronizing signals of a transmitted television signal are utilized to provide synchronization of both the color picture tube 25 and the cathode ray tube 49 for both programmed and film visual displays. In this manner, scan synchronization and interlace for both systems is integrated greatly reducing the probabilities of undesired flutter and misconvergence of the image display. However, it is to be understood that such synchronization and scan interlace is to be preferred although not absolutely essential to the operation of the reproduction system. Moreover, means may be added to the system to provide such synchronization and interlace of the scan systems at additional expense.

Additionally, it should be further noted that the above-described reproduction system is not necessarily confined to an optical system of the dichroic mirror and photomultiplier type tube design. For example, fiber bundles and numerous other techniques are suitable for splitting the light emerging from a film into color video signals representative of the colors red, green and blue. Also, means other than photomultiplier type tubes, such as photosensitive field effect transistors, for instance, may be utilized to convert the modulated light beam emerging from the film into electrical signals.

Further, the reproduction system is preferably but not necessarily confined to the utilization of color control signals, X and Z signals. Obviously, color difference signals may be utilized depending primarily upon the particular color television receiver design and the signals available from the demodulation system employed therein.

Thus, there has been provided a reproduction system for visually displaying both televised programs and photographic films. The system is compatible in that a visual display is provided in response to either monochrome or color programs and films. The reproduction system is economical, relatively uncomplicated, utilizes components common to both transducer systems, and is readily shifted from one to the other form of image reproduction.

We claim:

1. An image reproduction system comprising in combination:

optical-to-electrical signal transducer means for developing electrical signals representative of images on a photographic film and including a cathode ray tube means;

electrical-to-optical signal transducer means for developing electrical signals derived from transmitted television signals, horizontal and vertical sweep potentials, high voltage potentials, retrace and blanking potentials and focusing potentials and including an image reproducer means;

means for applying said horizontal and vertical sweep potentials, high voltage potentials, retrace and blanking potentials, and focusing potentials to said cathode ray tube means of said optical-to-electrical signal transducer means and to said image reproducer means of said electrical-to-optical signal transducer means; and switching means for selectively applying said electrical signals derived from transmitted television signals in said electrical-to-optical signal transducer means and said electrical signals derived from photographic film in said optical-to-electrical signal transducer means to said electrical-to-optical signal transducer means to provide an image display on said image reproducer means in accordance with the selected electrical signals.

2. The combination of claim 1 wherein said electrical-to-optical signal transducer means includes an enabling and disabling potential development means and said switching means selectively couples said enabling and disabling potential development means to said optical-to-electrical signal transducer means in accordance with selective utilization of electrical signals from said electrical-to-optical and optical-to-electrical signal transducer means.

3. The combination of claim 1 wherein said electrical-to-optical signal transducer means includes means for deriving synchronizing signals from transmitted television signals and applying said derived synchronizing signals to said electrical-to-optical and optical-to-electrical signal transducer means to effect synchronization therebetween.

4. The combination of claim 1 wherein said optical-to-electrical signal transducer means includes photographic film holder means and remote control means for selective deposition of film within said film holder means and selective positional location of said switching means whereby a remotely located viewer selects electrical signals from the electrical-to-optical or optical-to-electrical signal transducer means and the film within the film holder for viewing.

5. A compatible monochrome and color image reproduction system comprising in combination:

color television receiver means responsive to transmitted television signals for developing electrical signals and including enabling and disabling potential development means and a color cathode ray tube means;

flying spot scanner means for developing electrical signals from photographic film and including a cathode ray tube means; and switching means for selectively coupling electrical signals from said receiver means and said scanner means to said receiver means and said enabling and disabling potential development means to said scanner means whereby an observer of the color cathode ray tube selects for viewing image derived from transmitted television signal or photographic film.

6. The combination of claim 5 wherein said television receiver means includes means for developing and applying to said color cathode ray tube means and to said cathode ray tube means horizontal and vertical sweep potentials, high voltage potentials, retrace and blanking potentials, and focusing potentials.

7. The combination of claim 5 wherein said color television receiver means includes synchronizing signal development means responsive to transmitted television signals for developing and applying synchronizing signals to said receiver means and said scanner means to effect synchronization therebetween.

8. The combination of claim 5 wherein said receiver and scanner means each include means for developing signals representative of color information and said switching means selectively applies said signals to said receiver means to provide an image display on said color cathode ray tube.

9. A compatible monochrome and color image reproduction system comprising in combination:

flying spot scanner means for developing electrical signals from photographic film and including a cathode ray tube means;

color television receiver means for developing synchronizing signals and electrical signals from transmitted television signals and including a color cathode ray tube means, said synchronizing signals being applied to said cathode ray tube means of said scanner means and said color cathode ray tube means of said receiver means to effect synchronization therebetween; and switching means for selectively coupling electrical signals from said scanner means and said receiver means to said receiver means to provide an image display on said color cathode ray tube means.

10. The combination of claim 9 wherein said color television receiver means includes enabling and disabling potential development means and said switching means selectively couples said enabling and disabling potential development means to said flying spot scanner means.

11. The combination of claim 9 wherein said color television receiver means includes means for developing horizontal and vertical sweep potentials, high voltage potentials, retrace and blanking potentials, and focus potentials and means for applying said developed potentials to said receiver means and said scanner means.